US005667580A

United States Patent [19]

Bäbler

[11] Patent Number: 5,667,580
[45] Date of Patent: *Sep. 16, 1997

[54] PIGMENT COMPOSITIONS

[75] Inventor: Fridolin Bäbler, Hockessin, Del.

[73] Assignee: Ciba-Geigy Corporation, Tarrytown, N.Y.

[ * ] Notice: The term of this patent shall not extend beyond the expiration date of Pat. No. 5,584,922.

[21] Appl. No.: 475,163

[22] Filed: Jun. 7, 1995

Related U.S. Application Data

[63] Continuation-in-part of Ser. No. 305,549, Sep. 14, 1994, Pat. No. 5,584,922.

[51] Int. Cl.⁶ .................. C09C 1/04; C08K 5/00
[52] U.S. Cl. .............. 106/499; 106/410; 106/415; 106/416; 106/417; 106/464; 106/469; 106/470; 106/471; 106/491; 106/493; 106/494
[58] Field of Search .................. 106/415, 416, 106/417, 464, 469, 470, 471, 491, 494, 499, 410

[56] References Cited

U.S. PATENT DOCUMENTS

| | | | |
|---|---|---|---|
| 3,087,828 | 4/1963 | Linton | 106/417 |
| 3,087,829 | 4/1963 | Linton | 106/417 |
| 4,344,987 | 8/1982 | Ostertag et al. | 427/213 |
| 4,370,270 | 1/1983 | Back et al. | 540/141 |
| 4,435,220 | 3/1984 | Watanabe et al. | 106/417 |
| 4,517,320 | 5/1985 | Bäbler et al. | 523/215 |
| 4,741,780 | 5/1988 | Atkinson | 106/413 |
| 4,772,331 | 9/1988 | Naguchi et al. | 106/417 |
| 4,801,702 | 1/1989 | Babler | 540/144 |
| 4,909,852 | 3/1990 | Atkinson | 106/448 |
| 5,008,231 | 4/1991 | Yoshizawa et al. | 503/207 |
| 5,061,317 | 10/1991 | Korpi et al. | 106/417 |
| 5,074,918 | 12/1991 | Bäbler | 106/493 |
| 5,078,793 | 1/1992 | Caton | 106/417 |
| 5,084,573 | 1/1992 | Bäbler et al. | 546/56 |
| 5,095,122 | 3/1992 | Bugnan et al. | 548/453 |
| 5,165,915 | 11/1992 | Tokubo et al. | 424/63 |
| 5,298,076 | 3/1994 | Bäbler | 106/498 |
| 5,347,014 | 9/1994 | Bäbler | 548/453 |
| 5,441,564 | 8/1995 | Vogt | 106/417 |
| 5,562,763 | 10/1996 | Bruchner et al. | 106/403 |

FOREIGN PATENT DOCUMENTS

| | | |
|---|---|---|
| 0072520 | 2/1983 | European Pat. Off. . |
| 0220617 | 5/1987 | European Pat. Off. . |
| 0278633 | 8/1988 | European Pat. Off. . |
| 0362129 | 4/1990 | European Pat. Off. . |
| 0367236 | 5/1990 | European Pat. Off. . |
| 0416395 | 3/1991 | European Pat. Off. . |
| 0554776 | 3/1993 | European Pat. Off. . |
| 2210073 | 9/1973 | Germany . |
| 4037735 | 6/1992 | Germany . |
| 4211560 | 10/1993 | Germany . |
| 4225031 | 2/1994 | Germany . |
| 9311194 | 6/1993 | WIPO . |

OTHER PUBLICATIONS

Kirk–Othmer Encyclopedia of Chemical Technology, 3rd ed., John–Wiley, N.Y., vol. 11, pp. 377,378, 383 and vol. 17, p. 808. Dec. 1982.

Derw. Abst. 91–283612 [39] Af FR2657354A (Jul. 1991).

*Primary Examiner*—Mark L. Bell
*Assistant Examiner*—Scott L. Hertzog
*Attorney, Agent, or Firm*—George R. Dohmann; Kevin T. Mansfield

[57] ABSTRACT

The disclosure describes pigment compositions containing an organic pigment and a transparent filler having a mean particle size less than 10 μm and a narrow particle size distribution; as well as methods of preparing the pigment compositions. The pigment compositions are useful for pigmenting high-molecular-weight organic materials; especially coating compositions, curable ink systems, plastics, as well as for use in laser marking applications.

29 Claims, No Drawings

5,667,580

PIGMENT COMPOSITIONS

This is a continuation-in-part of U.S. application Ser. No. 08/305,549, filed Sep. 14, 1994, now U.S. Pat. No. 5,584,922.

SUMMARY

The present invention relates to pigment compositions comprising an organic pigment, and a substantially transparent filler with a distinct particle size and particle size distribution. Preferably the pigment composition also contains a texture-improving agent. The present invention also relates to processes for preparing the pigment composition and applications for the pigment compositions.

BACKGROUND

The object of the present invention is to provide organic pigments with enhanced pigment properties that are useful for the coloration of high-molecular-weight organic materials.

The present invention relates to the general discovery that pigment compositions containing a substantially transparent filler having particles of a specified particle size and particle size distribution show enhanced pigment properties in specific applications, such as the coloration of plastics or surface coatings, especially paints or printing inks.

Inorganic fillers are used in large quantities by the pigments industry for various purposes. For example, flaky micas, mainly with a particle size in the range from 10 to 30 μm, covered with a thin layer of a metal oxide, such as $TiO_2$, are used as a substrate for the preparation of pearlescent pigments. Due to their large particle size, these effect pigments are directly incorporated in automotive paint systems without a dispersion step, as stir-in pigments. However, paints containing such effect pigments usually have a clear coat layer above the pigmented base coat which improves the gloss by covering surface defects and/or unevenness caused by the large particles of the effect pigments.

For example, DE 4211560 discloses composite pigments wherein a mica is coated with various inorganic pigments. The reference broadly suggests that various fillers and pigments, including organic pigments, can be combined to form coated particles having the same geometry as the filler.

The fillers in the inventive pigment compositions are not generally coated by the organic pigment. Instead, the inventive pigment compositions are physical mixtures wherein the filler is, for the most part, not coated with the organic pigment. Thus, when the inventive pigment compositions are dispersed, an electronmicrograph shows that the filler and organic pigment are present as distinct components of the composition. The inventive pigment compositions perform well as pigments for plastics to be used in extrusion and molding processes, as stir-in pigments for coating compositions, in laser marking applications and for ultraviolet (UV) or electron-beam (EB) cured ink systems.

DETAILED DESCRIPTION

This invention relates to pigment compositions which comprise from 1 to 35 parts by weight of a filler and from 65 to 99 parts by weight of an organic pigment, wherein the filler has a mean particle size smaller than 10 μm, and a narrow particle size distribution, wherein at least 75 percent of the particles are smaller than 1.5 μm; wherein the sum of the parts by weight of the filler and the organic pigment is 100. Preferably at least 95 percent of the particles are smaller than 2.7 μm. In general, it is preferred for 99 percent of the particles to be smaller than 3.5 μm. Preferably, the mean particle size of the filler is in the range from 0.1 to 9 μm, most preferably from 0.2 to 4 μm. The size measured for determining the particle size being the longest dimension of the filler particle.

The inventive pigment compositions are physical mixtures of the filler and pigment wherein the filler particles are mostly uncoated by the pigment. The term "mostly" is intended to mean that although there may be some coated particles in the pigment composition, such coated filler particles do not constitute a large portion of the filler particles in the pigment composition. The term "physical mixture" means that the pigment and filler particles are distinct from each other, especially when the pigment composition is dispersed, and that the pigment particles do not generally coat the filler particles.

The expression "filler" means any substantially transparent inorganic or organic particulate substance which possesses the mean particle size and particle size distribution described above; especially when dispersed in a solvent, such as, lipophilic or hydrophilic solvents and/or water.

The expression "inorganic filler" means a substantially transparent inorganic filler. For example, mica, kaolin, talc and natural or synthetic silicas, e.g. glass, are well-known inorganic fillers that are suitable for use in the pigment compositions of the present invention.

Transparent micas are especially suitable for use as an inorganic filler. Of the micas, muscovite, phlogopite, brolite and synthetic micas are most suitable.

Talc, muscovite mica and kaolin are highly suitable inorganic fillers.

The inorganic filler is preferably used in its natural form but can include treated transparent or semitransparent inorganic filler pigments, for example a mica treated with a metal oxide, or talc treated with organic aliphatic compounds like long chain aliphatic acids. In general, the inorganic filler consists of primary filler particles having any geometric shape, preferred a flaky shape.

The expression "organic filler" means substantially transparent, organic particles. Usually organic fillers are particles of high-molecular-weight materials which are obtained by known methods, such as micropulverization of plastics, or preferably by direct polymerization processes which yield fine particles. Throughout this application the expression "direct process" when referring to the method of preparing the organic filler means emulsion or suspension polymerization processes or precipitation processes which yield particles having the required particle size properties.

For example, micronized polyamide, polypropylene and polyethylene/polytetrafluoroethylene waxes which fulfill the particle size range and particle size distribution requirements are suitable as organic fillers.

Polyolefins are particularly suitable organic fillers, especially polyolefins selected from the group consisting of ethylene homopolymers and copolymers, propylene homopolymers and copolymers, ethylene and propylene copolymers, and mixtures thereof. Preferably such fillers are prepared by a "direct process".

Polyamide powders are highly suitable for use as the organic filler due to their chemical resistance and high melting point. Highly suitable polyamide powders are commercially available, such as ORGASOL 2001 UD NAT1 from ELF ATOCHEM.

In general, the organic filler consists of primary particles having any geometric shape. Preferably the shape is flaky, contoured-convexed, spherical or oblong. Spherical particles obtained by direct polymerization processes are most preferred.

The presence of a small particle size filler enhances certain properties of the organic pigment, such as surface characteristics, gloss and dispersibility. The improved dispersibility results in high color strength when incorporated into plastics. The improved surface characteristics and gloss provide improved performance when used in coatings and inks.

Since this invention is based on the discovery that the particle size and particle size distribution of the filler is critical to its utility as a specialized pigment composition, the present method is a general method applicable with any organic pigment or pigment crude.

Preferably the organic pigment has an average particle size in the range of from 0.005 to 10 μm, most preferably within the range from 0.01 to 5 μm. Based on these average particle size ranges, it is clear that the organic pigment is used in the form of a pigment crude or a conditioned pigment.

Especially suitable classes of pigments and pigment crudes include the azo, azomethine, methine, anthraquinone, phthalocyanine, perinone, perylene, diketopyrrolopyrrole, thioindigo, iminoisoindoline, iminoisoindolinone, quinacridone, flavanthrone, indanthrone, anthrapyrimidine and quinophthalone pigments; in particular the diketopyrrolopyrrole, quinacridone, phthalocyanine, indanthrone or iminoisoindolinone pigments.

Notable pigments useful in the present process are those pigments described in The Colour index, including the quinacridone pigments, such as C.I. Pigment Red 202, C.I. Pigment Violet 19, and C.I. Pigment Red 122; the perylene pigments, for example, C.I. Pigment Red 179; the azo condensation pigments, for example, C.I. Pigment Red 170, C.I. Pigment Red 144, and C.I. Pigment Brown 23; the isoindolinone pigments, for example, C.I. Pigment Orange 61, C.I. Pigment Yellow 109, and C.I. Pigment Yellow 110; the diketopyrrolopyrrole pigments, for example, C.I. Pigment Red 254, C.I. Pigment Red 255; C.I. Pigment Red 264, C.I. Pigment Orange 71, and C.I. Pigment Orange 73; the copper phthalocyanine pigments, for example, C.I. Pigment Blue 15; and the anthraquinone pigments, for example, C.I. Pigment Blue 60, C.I. Pigment Red 177 and C.I. Pigment Yellow 147.

In general, the present compositions comprise of from 65 to 99 parts by weight of the organic pigment and of from 1 to 35 parts by weight of the filler. Preferably the compositions contain from about 70 to 97 parts by weight of the organic pigment and about 3 to 30 parts by weight of the filler, most preferably from about 75 to 95 parts by weight of the organic pigment and from about 5 to 25 parts by weight of the filler.

In general, the particle size distribution curve of the filler can have any shape as long as the requirements specified above are met. Of particular interest are fillers having mono-modal or bi-modal particle distribution curves. Examples of such fillers include the inorganic fillers ULTRA TALC 609 from Barrets Minerals Inc. (talc) and CANFIL 7 from Canada Talc Ltd. (talc) and the organic fillers ORGASOL 2001 UD NAT1 from ELF ATOCHEM (polyamide powder) and LUWAX AF 30 from Hoechst (polyethylene powder).

The pigment compositions are generally prepared by conventional methods, for example, by mixing the individual components in the desired ratio as dry powders, or, preferably, by blending the aqueous presscake of the organic pigment together with the filler pigment in water and then isolating the pigment composition by filtration. The pigment composition is then dried, for example by spray, fluidized bed, tray, spin flash or horizontal rotary vacuum drying, preferably by spray, fluidized bed or tray drying, optionally followed by micropulverization or air-jet pulverization.

Depending on the pigment and its preparatory or conditioning process, in certain cases it is possible to add the inorganic and/or organic polymeric filler in the beginning or during the pigment synthesis or pigment conditioning process. This method is particularly useful when the pigment is prepared or conditioned by a precipitation method, as described, for example, in U.S. Pat. No. 4,579,949, U.S. Pat. No. 5,286,863 or U.S. patent application Ser. No. 08/321, 443, or by a wet-milling process.

The present compositions can consist of the organic pigment and the filler. However, the pigment compositions can additionally contain customary additives, including light stabilizers and texture-improving agents. Preferred pigment compositions consist essentially of the organic pigment, the filler, the light stabilizer and/or the texture-improving agent.

Useful light stabilizers are U.V. light absorbers, for example, benzotriazoles or hindered amine light stabilizers (HALS).

Texture-improving agents are especially useful as an additional component which can improve the properties of the pigment compositions. Suitable texture-improving agents include fatty acids having at least 12 carbon atoms, and amides, esters or salts of fatty acids. Typical fatty acid derived texture-improving agents include fatty acids such as stearic acid or behenic acid, and fatty amines like lauryl amine, or stearylamine. In addition, fatty alcohols or ethoxylated fatty alcohols, polyols, like aliphatic 1,2-diols or polyvinylalcohol and epoxidized soya bean oil, resin acids and resin acid salts are suitable texture-improving agents. Rosin acids and rosin acid salts are especially suitable texture-improving agents.

The texture-improving agent is incorporated into the composition before, during or after blending the organic pigment and the filler. The texture-improving agent or mixtures thereof are preferably incorporated into the pigment composition in an amount of from 0.05 to 20 percent, most preferably 1 to 10 percent, by weight, based on the combined weights of the inorganic filler pigment and the organic pigment. Thus, if the sum of the parts by weight of the organic pigment and the filler equals 100, the composition contains from 0.05 to 20 parts of the texture-improving agent, preferably 1 to 10 parts, in addition to the 100 parts of organic pigment and filler.

Pigments compositions which include a texture-improving agent are effectively prepared, for example, by a process which comprises (a) blending an aqueous suspension containing the filler and the organic pigment with a water-soluble rosin acid salt; (b) precipitating an insoluble salt of the rosin acid by adding a divalent or trivalent metal salt to the suspension, and (c) then isolating a presscake of the pigment composition by filtering the suspension. The process can additionally comprise a wet-milling step before or after step(b). The presscake obtained is then dried, for example in fluidized bed, spray-drying or tray-drying equipment, and then optionally micropulverized to form the pigment composition of the present invention. The spray drying is carried out according to procedures known in the art preferably, however, with pigment presscake slurries having a solid content above 22%, most preferably between 25–30%.

Notable pigment compositions are those which comprise a muscovite mica and/or talc and/or ultrafine polyamide or polyethylene particles as the filler and a diketopyrrolopyrrole and/or a quinacridone pigment or pigment crude, or a pigment solid solution as described, for example, as described in U.S. Pat. No. 4,783,540 or U.S. Pat. No. 4,810,304, as the organic pigment. Throughout this application the expression "diketopyrrolopyrrole" refers the class of pigments known in the art as 3,6-diaryl-1,4-diketopyrrolo[3,4-c]pyrroles or in the chemical literature as 3,6-diaryl-1,4-diketo-2,5-dihydro-pyrrolo[3,4-c]pyrroles. Quinacridone pigments are well-known in the art, as are solid solution pigments.

Generally, an effective pigmenting amount of the inventive pigment composition is incorporated into a high-molecular-weight organic material to be pigmented. An effective pigmenting amount is any amount suitable to provide the desired color in the high-molecular-weight organic material. In particular, the pigment compositions are used in an amount of 0.01 to 30% high-molecular-weight organic material to be pigmented. Thus, the present invention embraces a method of preparing a pigmented a high-molecular-weight organic material, which comprises incorporating an effective pigmenting amount of an inventive pigment composition into the high-molecular-weight organic material.

The pigmented, high-molecular-weight organic materials which are colored according to the present process are useful in a variety of applications. For example, the high-molecular-weight organic material can be used for the preparation of lacquers, inks and enamel coating compositions. The pigmented high-molecular-weight organic materials prepared according to the present invention are particularly useful for preparing automotive coating paints.

The high-molecular-weight organic materials which are colored according to the present process are, for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

High-molecular-weight organic materials which are useful for heat curable coatings or cross-linking, chemically-reactive coatings, are also colored according to the present process. The pigmented, high-molecular-weight organic materials prepared according to the present process are especially useful in stoving finishes which contain the customary binders and which are reactive at high temperature. Examples of the pigmented, high-molecular-weight organic materials which are used in coatings include acrylic, alkyd, epoxy, phenolic, melamine, urea, polyester, polyurethane, blocked isocyanate, benzoguanamine or cellulose ester resins, or combinations thereof. The present pigment compositions are particularly useful as pigments for automotive painting systems. The pigmented, high-molecular-weight organic materials prepared according to the present process are also useful as air-drying or physically drying coatings, for example, conventional lacquers such as those used in the cosmetics industry as nail varnishes, for example nitrocellulose lacquers.

Due to the small particle size of the inorganic and/or polymeric organic filler the present pigment compositions are particularly suitable for coloring high-molecular-weight organic materials which are plastics that are calendared, cast, molded or processed to fibers, and the like. Such pigmented plastics show practically no abrasion during processing. The pigment compositions impart excellent physical properties to colored plastic articles like polypropylene or polyamide fibers, plastic films, bottle crates and so on. Thus, the present invention further embraces processes wherein the high-molecular-weight organic compound is a plastic that is calendared, cast, molded or processed to fibers and to plastic articles that are calendared, cast, molded or processed to fibers.

Moreover, the present pigment compositions containing the appropriate organic pigment are ideally suited for their use in UV/EB cured ink systems. In general, UV or EB cured ink systems are those ink systems which utilize a UV or EB photoinitiator to initiate curing. It is known that the majority of inorganic transparent fillers absorb very little ultraviolet radiation over the wavelength range which is commonly used to activate most UV photoinitiators (200–400 nm). As a consequence, such systems containing the present pigment compositions are adequately cured even in thicker coatings. Thus, the inventive method embraces processes wherein the high-molecular-weight organic compound is a UV or EB curable ink system.

Additionally, the present pigment compositions can be advantagously used as pigments for laser marking as described, for example, in U.S. Pat. No. 5,075,195, which is here incorporated by reference. Thus, the present invention comprises a method of laser marking, which comprises irradiating a substrate which contains a pigment composition of the present invention with a laser.

The present pigment compositions can be used alone or in conjunction with other pigments or dyes. They are especially suitable for coloring the coatings which are employed in the automotive industry, especially in acrylic/melamine resin, alkyd/melamine resin or thermoplastic acrylic resin systems, as well as in aqueous-based coating systems.

Coatings and ink systems colored by the present compositions possess excellent heat, light and weatherfastness, as well as bleed and overspraying fastness properties.

Due to the excellent dispersibility behavior of the present pigment compositions, uniform distribution of pigment particles through the entire application media is achieved. The inventive pigment compositions show excellent rheological behavior. Thus, the present invention includes those processes wherein the high-molecular-weight organic material is an automotive paint system.

Many of the present pigment compositions are useful as stir-in pigments, which means that they are adequately dispersed in the high-molecular-weight organic material simply by mixing the pigment and high-molecular-weight organic material using a low-sheer-force method, such as stirring with a propeller or disk stirrer, without further dispersion steps. Since no additional dispersion step is required to achieve substantially homogeneous distribution of the pigment composition in the high-molecular-weight organic compound, many of the present pigment compositions are particularly useful as stir-in pigments for aqueous and solvent-based, as well as monocoat, two coat and thin film paint systems. Thus, the present invention includes processes wherein the high-molecular-weight organic material is a coating composition and the pigment composition is incorporated into the coating composition as a stir-in pigment.

The inventive pigment compositions are especially suitable for pigmenting the high-molecular-weight organic material in conjunction with effect pigments like metallic, graphite or pearlescent pigments. The color effect and shade are varied by varying the kind and the concentrations of the effect pigment and the inventive pigment compositions. Particularly striking effect shades are generated by using the present pigment compositions with known transparent titanium dioxide-coated mica pigments.

The present invention further relates to plastic articles which comprise an effective pigmenting amount of an inventive pigment composition, ultraviolet or electron beam curable inks which comprise an effective pigmenting amount of an inventive pigment composition and to coating compositions which comprise an effective pigmenting amount of an inventive pigment composition.

The following examples further describe the embodiments of the invention, but do not limit the scope of the invention. In the examples, all parts are by weight unless otherwise indicated.

The particle sizes and particle size distributions of the fillers given in the following examples are determined as described below:

MEASUREMENT METHOD

Particle size distribution is determined in accordance with the principle of Fraunhofer light diffraction. A laser beam passes through the sample and the resulting diffraction pattern is focused on a multielement detector. Since the diffraction pattern depends, among other parameters, on particle size, particle size distribution can be calculated on the basis of the measured diffraction pattern of the sample. The cumulative volume distribution is determined using a Fraunhofer diffraction instrument, e.g. a COMPETITION/5-HELOS/KA, from SYMPATEC GmbH, D-38644 Goslar, in accordance with the instruction manual.

EXAMPLE 1

252.3 grams of an aqueous presscake containing 98.4 grams 3,6-di (4-chlorophenyl)-1,4-diketopyrrolo[3,4-c]-pyrrole pigment crude consisting of primary pigment particles having an isometric shape with a particle size in the range from 0.2 to 0.5 µm determined by electron microscopy, 21.6 g of a talc (ULTRA TALC 609 from Barrets Minerals Inc.) with an average particle size of around 3.5 µm, wherein 99% of the particles are less than 15 µm, and 3.6 grams of a sodium salt of a rosin (DRESINATE X from HERCULES Corp.) dissolved in 40 ml water are blended together with 500 to 700 ml of water in a blender equipped with a 4 liter stainless steel container. The resulting homogenous pigment suspension is transferred into a 4 liter beaker equipped with a stirrer and stirred at ambient temperature for 15 minutes. A solution of 1.2 grams calcium chloride in 30 ml water is added and the pH is adjusted to 5.0 to 5.5 by the addition of dilute hydrochloric acid. The bright red pigment suspension is stirred for 45 minutes at pH 5.0 then filtered. The presscake is washed with water until salt-free and subsequently tray dried in an oven at 80°–100° C. The procedure yields 121 grams of a pigment composition containing 2.9% Ca salt of rosin, 17.5% talc and 79.6% diketopyrrolopyrrole pigment.

The pigment composition is micropulverized in an assemble micropulverizer (The BANTAM, type G90 from American Marietta Company) using a 0.027 inch round hole screen and a rotating speed of 10500 RPM.

The pigment shows excellent pigment properties like heat, light and weather resistance. Due to its excellent dispersibility, it is useful as an organic stir-in pigment.

EXAMPLE 2

The procedure of Example 1 is repeated replacing the talc with a polymeric polyethylene filler (LUWAX AF 30 from Hoechst) having an average particle size of about 6 µm, wherein about 94% of the particles are less than 15 µm.

EXAMPLE 3

The procedure of Example 1 is repeated replacing the talc with a polymeric polyamide filler (ORGASOL 2001 UD NAT1 from Elf Atochem) having an average particle size of about 4.7 µm, wherein 100% of the particles are less than 15 µm, yielding a pigment composition of comparable pigment properties when applied in plastics or paints.

EXAMPLE 4

341.6 grams aqueous presscake containing 96 grams of an unsubstituted quinacridone pigment consisting of primary pigment particles with a particle size in the range of 0.1 to 0.3 µm determined by electron microscopy, 24.0 grams of the talc described in Example 1, 2.6 grams 1,2-dodecanediol and 3.6 grams of a sodium salt of a rosin (DRESINATE X from Hercules Corp.) dissolved in 40 ml water are blended together with 450 ml of water in a blender equipped with a 4 liter stainless steel container. The resulting homogenous pigment suspension is transferred into a 4 liter beaker equipped with a stirrer, thermometer, pH-electrode and steam inlet tube. The suspension is stirred and heated to 70° C. by introducing steam into the pigment suspension. The pH of the suspension is adjusted to 8.0 to 8.5 and 30 ml of an aqueous solution containing 2.0 grams calcium chloride is added. The pH is then adjusted to 5.0 to 5.5 and the suspension is stirred for 30 minutes at 70°–75° C., then cooled to 40° C. by stirring without steam introduction. The resulting homogenous pigment suspension is filtered and washed with water. The presscake is dried and micropulverized in an assemble micropulverizer using a 0.027 inch round hole screen and a rotating speed of 10500 RPM. The pigment powder so obtained shows highly saturated red colorations with excellent pigment properties like heat, weather and lightfastness. Due to its excellent dispersibility and small particle size filler, it is useful as an organic stir-in pigment yielding smooth, even, high gloss surface coatings.

EXAMPLE 5

Example 4 is repeated replacing the 1,2-dodecanediol with 2.6 grams of epoxidized soy bean oil, yielding a pigment with comparably good pigment properties.

EXAMPLE 6

Example 4 is repeated replacing the 1,2-dodecanediol with 2.5 grams of an ethoxylated fatty alcohol with a molecular weight of around 620, yielding a pigment with comparably good fastness and pigment properties.

EXAMPLE 7

Example 4 is repeated using 4.0 grams of 1,2-dodecanediol and 1.0 grams of an ethoxylated fatty alcohol with a molecular weight around 620, but no rosin acid. A pigment with comparably good pigment properties is obtained.

EXAMPLE 8

The procedure of Example 1 is repeated replacing the 3,6-di(4-chlorophenyl)-1,4-diketopyrrolo [3,4-c]-pyrrole with 3,6-di(4-tertiarybutylphenyl)-1,4-diketopyrrolopyrrole pigment crude consisting of primary pigment particles in a particle size range from 0.2 to 1.2 μm, as determined by electron microscopy, to yield an orange pigment composition with excellent dispersibility in paints and plastics, high saturation, excellent fastness properties, high opacity and high color strength. The pigment composition is suitable for use as a stir-in pigment for automotive paint systems.

EXAMPLE 9

The procedure of Example 1 is repeated using as a pigment 3,6-di(4-biphenylyl)-1,4-diketo-pyrrolo[3,4-c] pyrrole consisting of primary pigment particles in a particle size range from 0.2 to 0.4 μm and a talc powder (CANFIL 7 from Canada Talc Ltd.) having an average particle size of about 8.2, wherein 79% of the particles are less than 15 μm and 95% of the particles are less than 25 μm, yielding a red pigment composition with excellent pigment properties.

EXAMPLE 10

188.4 grams of an aqueous presscake containing 88.0 grams of a conditioned indanthrone blue pigment with an average particle size below 0.1 μm and a specific surface area of around 65 m2/g, 22.0 grams of the talc described in Example 1, 4.3 grams of a sodium salt of a rosin (DRESINATE X from HERCULES Corp.) dissolved in 40 ml water are blended together with 500 ml water in a blender. The resulting homogenous pigment suspension is transferred to a 5 liter flask equipped with a stirrer, condenser and thermometer. The suspension is stirred for 2 hours at 70°–75° C., then 1.6 grams of calcium chloride dissolved in 40 ml water are added and the pH is adjusted to 5.0 to 5.5. The blue pigment suspension is cooled to 40° C., filtered, the presscake washed with water and dried. The pigment is then micropulverized in an assemble micropulverizer using a 0.027 inch round hole screen and a rotating speed of 10500 RPM. The blue pigment powder is ideally suited for use as a transparent organic pigment in conjunction with effect pigments like $TiO_2$ coated mica pigments in automotive coatings.

EXAMPLE 11

A 1 liter flask equipped with a thermometer, stirrer, condenser and gas inlet tube is charged with 102 grams of 2,9-dimethyl-6,13-dihydroquinacridone, 1.6 grams anthraquinone-2-sulfonic acid, sodium salt monohydrate and 550 ml dimethylsulfoxide. The suspension is stirred and a mixture of 78 grams 45% aqueous potassium hydroxide and 60 ml water are added. The reaction mixture is heated to 80°–83° C. During the heating period, the oxidation mixture is flushed with nitrogen to an oxygen content of 0% in the off-gas stream indicated by an oxygen analyzer. Air is then introduced under the surface of the stirred reaction mixture at a rate of 200 ml/minute for 115 to 120 minutes until the oxygen analyzer indicates 6% oxygen in the off-gas stream. 1.4 grams phthalimidomethylquinacridone as particle growth inhibitor and 22 grams of the talc described in Example 1 are added. The resulting deep blue hot reaction mixture is stirred for 5 additional minutes at 80°–83° C.

A separate 5 liter flask equipped with a stirrer, condenser and thermometer is charged with 2 liters of methanol at 20°–25° C. The deep blue hot reaction mixture is transferred into the methanol, precipitating a magenta 2,9-dimethylquinacridone. The pigment suspension is stirred for 2 hours at 38°–42° C., and then filtered. The presscake is successively washed dimethylsulfoxide free with about 2 liters of methanol and then 3.5 liters of hot water until methanol and base free and then dried.

The dried pigment composition is micropulverized in an assemble micropulverizer using a 0.027 inch round hole screen and a rotation speed of 10500 RPM. The magenta 2,9-dimethyl quinacridone is suitable for the incorporation in UV or EB curing ink systems yielding fast curing highly saturated magenta colored coatings.

EXAMPLE 12

A 1 liter flask equipped with a thermometer, stirrer, and condenser is charged with 41.3 grams of 45% aqueous potassium hydroxide, 40 ml water and 350 ml DMSO. Seventy grams of 3,6-di(4-biphenyl)-1,4-diketopyrrolo[3,4-c]pyrrole crude are added under stirring at 40°–50° C. The mixture is heated to 80°–85° C. and stirred at 80°–85° C. for 10 minutes. 14 grams of the talc described in Example 1 is added into the resulting dark solution of the pigment salt. The pigment salt solution with the talc powder is then drowned into 2 liters of water at 18°–22°0 C. causing the temperature to rise to 40° C. The pigment suspension is stirred at 35°–40° C. for 2 hours. The pigment is filtered and washed with water to a pH 8–8.5. The aqueous pigment presscake is dried and micropulverized. The pigment composition shows a highly transparent, strongly saturated bluish red color and excellent durability when applied in plastics or paints. It is ideally suited for the incorporation into aqueous and solvent based automotive coatings, particularly in conjunction with pearlescent effect pigments.

EXAMPLE 13

The procedure of Example 10 is repeated replacing the indanthrone pigment with a small particle size conditioned beta Cu-phthalocyanine pigment to yield a blue pigment composition suitable for paint and ink applications, particularly UV/EB curing ink systems.

EXAMPLE 14

Example 2 is repeated using as pigment the isoindolinone pigment, C.I. Pigment Yellow 110 to yield a yellow pigment composition having excellent pigment properties when applied in paints and coating systems.

EXAMPLE 15

The procedure of Example 7 is repeated using 3,6-diphenyl-1,4-diketopyrrolo[3,4-c]-pyrrole as the organic pigment to yield a red highly saturated pigment composition having excellent pigment properties when applied in paints and coatings.

EXAMPLES 16A TO 16D

Resin solutions are prepared as follows:

I. Solid clear solution

The following ingredients are stirred together to provide a "solid clear solution" containing 57.53% solids:

1171 grams of a nonaqueous dispersion resin (NAD-resin), 719.1 grams of a melamine resin, 269.4 grams of a solvent mixture of aliphatic and aromatic hydrocarbons (SOLVESSO 100 distributed by American Chemicals), 597.6 grams of polyester urethane resin, 125.1 grams of a catalyst solution, and 120 grams of butanol.

II. Metallic clear solution

The following ingredients are stirred together to provide a "metallic clear solution" containing 59.2% solids:

- 1353.0 grams of a nonaqueous dispersion resin,
- 786.2 grams of melamine resin,
- 144.6 grams of xylene,
- 65.6 grams of UV Screener Solution,
- 471.6 grams of acrylourethane resin,
- 89.0 grams of catalyst solution, and
- 90.0 grams of methanol.

III. Mica dispersion

The following ingredients are stirred together to provide a mica dispersion containing 27.9% pearlescent mica pigment and a total solid content of 69.1% solids:

- 251.1 grams of bright white mica, EXTERIOR MEARLIN from The Mearl Corp.,
- 315.0 grams of NAD-resin, and
- 180.0 grams of acrylourethane resin.

IV. Stir-in pigment dispersion

The following ingredients are stirred together in an ½ pint can:

- 66.0 grams of acrylourethane resin,
- 14.5 grams of AB-dispersant, and
- 58.1 grams of SOLVESSO 100.

26.4 grams of the diketopyrrolopyrrole pigment obtained according Example 1 are then added to the above resin/solvent mixture as a stir-in pigment. The red pigment dispersion is stirred at slow to medium speed for 15 to 20 minutes, providing a homogeneous non-viscous stir-in pigment dispersion containing 16.0% red diketopyrrolopyrrole pigment, a total solid content of 48% solids in a pigment to binder ratio of 0.5.

V. TiO$_2$-dispersion

A TiO$_2$ dispersion is prepared by mixing the following ingredients in a quart can:

- 604.1 grams of a TiO$_2$ pigment,
- 129.8 grams of acrylourethane resin, and
- 161.1 grams of SOLVESSO 100.

1 pint of ½" ceramic balls are then added. The dispersion is then milled for 24 hours. The white pigment dispersion is separated from the balls yielding a "TiO2 dispersion" containing 67.5% pigment with a total solid content of 77.4% solids.

EXAMPLE 16A

Masstone Color Shade:

53.5 grams "stir-in pigment dispersion IV" and 76.5 grams "solid clear solution I" are combined with stirring. The red resin/pigment dispersion is sprayed onto a panel twice in a 1.5 minute interval as basecoat. After 2 minutes, clearcoat resin is sprayed twice at 1½ minute intervals onto the basecoat. The sprayed panel is then flashed with air in a flash cabinet for 10 minutes and then "baked" in an oven at 250° F. (121° C.) for 30 minutes, yielding a high chroma red colored panel, with excellent weatherability. A microscopic evaluation shows a homogeneous distribution of the pigment particles in the coating system.

EXAMPLE 16B

An 80/20 white mica shade is prepared by mixing the following ingredients:

| | |
|---|---|
| 46.1 grams | "stir-in pigment dispersion IV" |
| 6.6 grams | "mica dispersion III" |
| 6.9 grams | NAD resin, |
| 70.4 grams | "metallic clear solution II" |

The red pigment/pearlescent mica/resin dispersion is sprayed onto a panel followed by a clearcoat as described in Example 16A. A red effect color paint is obtained which shows excellent weatherability. The pigment particles are homogeneously distributed in the coating system. Additionally, the paint shows a high gloss.

EXAMPLE 16C

A 50/50 white mica shade is prepared by mixing the following ingredients:

| | |
|---|---|
| 29.9 grams | "stir-in pigment dispersion IV" |
| 17.1 grams | "mica dispersion III", |
| 6.4 grams | acrylourethane resin, |
| 3.6 grams | NAD resin, |
| 73.0 grams | "metallic clear solution II." |

The red pigment/pearlescent mica/resin dispersion is sprayed onto a panel followed by a clearcoat as described in Example 16A. A red effect color paint is obtained which shows an attractive flop and excellent weatherability and gloss properties. The pigment particles are homogeneously distributed in the coating system.

EXAMPLE 16D

A 10/90 tint shade is prepared by mixing the following ingredients:

| | |
|---|---|
| 7.7 grams | "stir-in pigment dispersion IV" |
| 16.4 grams | "TiO$_2$ dispersion V", |
| 14.3 grams | acrylourethane resin, |
| 61.6 grams | "solid clear solution I" |

The red pigment/TiO$_2$/resin dispersion is sprayed onto a panel followed by a clearcoat as described in Example 16A, yielding a high gloss red tinted panel in which the pigment particles are homogeneously dispersed.

Similar results are achieved if the pigment composition of Example 1 is replaced by the pigment compositions of Examples 2 to 9 or Examples 14 or 15.

EXAMPLE 17

This example demonstrates the incorporation of a pigment composition into a monocoat high solid enamel automotive coating system, without a dispersion step, directly as a stir-in pigment.

"Stir-in pigment dispersion":

In a ½ pint can were added

| | |
|---|---|
| 64.2 grams | high solids acrylic resin |
| 14.5 grams | AB-dispersant |
| 60.1 grams | xylene |

The can containing the above mixture is shaken for 10 minutes on a shaker.

Under stirring at medium speed are added into the above resin/solvent mixture as a stir-in pigment 26.4 grams diketopyrrolopyrrole pigment composition obtained according to Example 1. The red pigment dispersion is stirred at medium speed for 15 minutes providing a homogenous nonviscous "stir-in pigment dispersion", containing 16.0% diketopyrrolopyrrole pigment composition with a total solid content of 48% solids in a pigment/binder ratio of 0.5.

"Paint-dispersion":

| 54.6 grams | of the above "stir-in pigment dispersion" |
| 17.5 grams | high-solids acrylic resin |
| 21.6 grams | melamine resin, and |
| 31.3 grams | solid clear solution (described in Example 16A to 16D) | are combined with stirring. The red resin/pigment dispersion is thinned with SOLVESSO 100 to a spray viscosity of 28 seconds as determined by a #4 Ford cup and sprayed onto a panel three times in a 2 minute interval. The sprayed panel is then flashed with air in a flash cabinet for 10 minutes then "baked" in an oven at 265° F. (130° C.) yielding a high chroma red colored panel, with excellent weatherability. The panel shows an even high gloss surface with excellent weatherability and opacity.

EXAMPLE 18

This example describes the incorporation of a pigment composition containing a small particle size transparent organic pigment in conjunction with an aluminum effect pigment by a dispersion step.

A mixture of 130 grams of steatite balls (diameter:8 mm) and 45.5 grams of a thermosetting acrylic finish, which finish is a mixture of the following composition:

| 41.3 | grams of acrylic resin |
| 16.3 | grams of melamine resin |
| 32.8 | grams of xylene, |
| 4.6 | grams of ethylglycol acetate, |
| 2.0 | grams of butyl acetate, |
| 1.0 | grams of SILICONOIL A, 1% in xylene (BAYER AG), and |
| 2.5 | grams of the pigment composition obtained in Example 12 | are dispersed in a 200 ml glass flask with a twist off seal on a roll stand over the course of 72 hours. The steatite balls are separated and 8.0 grams of the millbase, 0.6 grams of aluminum paste, 1.0 grams of methyl ethyl ketone and 18.4 grams of the above mentioned thermoserring acrylic finish are thoroughly mixed and the resulting mixture is sprayed onto aluminum panels and subsequently baked at 130° C. for 30 minutes. Very strong bluish red metallized coatings having excellent fastness properties are obtained. Similar results in different color shades are obtained if the pigment composition of Example 12 is replaced by the pigment compositions of Example 10, 11 or 13.

EXAMPLE 19

This example demonstrates the incorporation of a pigment composition containing a small particle size organic pigment in conjunction with a pearlescent mica pigment by a dispersion step.

The following ingredients are added into ½ pint jar containing as dispersion media.

| 66.0 grams | of acrylourethane resin, |
| 14.5 grams | of AB-dispersant, |
| 58.1 grams | of SOLVESSO 100, and |
| 26.4 grams | indanthrone blue pigment composition obtained according to Example 10 |

The pigment is dispersed by rolling the above mixture for 64 hours. The pigment dispersion is separated from the dispersion media providing a homogenous "millbase dispersion" containing 16.0% blue pigment composition, a total solid content of 48.0% solids in a pigment to binder ratio of 0.5. Despite the small pigment particle size, the dispersion shows excellent viscosity data.

An 80/20 white mica shade is prepared by mixing the following ingredients:

| 46.1 grams | of the above blue millbase dispersion |
| 6.6 grams | of a "mica dispersion" as describe in Example 16A–16D |
| 6.9 grams | of a nonaqueous dispersion (NAD)-resin, and |
| 70.4 grams | of a "metallic clear solution" as described in Example 16A |

The blue pigment/pearlescent mica/resin dispersion is sprayed onto a panel followed by a clearcoat as described in Example 16A. A blue color effect paint which shows excellent weatherability is obtained. The paint shows a high gloss and attractive flop.

EXAMPLE 20

This example demonstrates the incorporation of the inventive pigment composition into a PVC sheet.

63.0 grams of polyvinylchloride, 3.0 grams epoxidized soya bean oil, 2.0 grams of barium/cadmium heat stabilizer, 32.0 grams dioctyl phthalate and 1.0 gram of the pigment composition prepared according to Example 1 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2 by constant folding, removal and feeding. The resulting soft PVC sheet is colored in an attractive red shade with excellent fastness to heat, light and migration.

EXAMPLE 21

This example demonstrates the incorporation of a pigment composition into HDPE.

5 grams of the pigment composition prepared according to Example 1, 2.5 grams hindered amine light stabilizer, 1.0 gram benzotriazole UV absorber, 1.0 gram hindered phenol antioxidant and 1.0 gram phosphite process stabilizer are mixed together with 1000 grams of high density polyethylene at a speed of 175–200 rpm for 30 seconds after flux. The fluxed pigmented resin is chopped up while warm and malleable, and then fed through a granulator. The resulting granules are molded on an injection molder with a 5 minute dwell time and a 30 second cycle time at temperatures of 205° C., 260° C. and 315° C. Homogeneously colored chips which show a similar red color is obtained at each of the temperature steps, demonstrating the excellent heat stability of the pigment composition. Similar results in different color shades are obtained if the pigment of Example 4 is replaced by the pigment compositions of Examples 5 to 7.

EXAMPLE 22

This example demonstrates the incorporation of a pigment composition into polypropylene fibers.

1000 grams of polypropylene granules (DAPLEN PT-55®, from Chemie Linz) and 10 grams of the pigment composition obtained in Example 4 are thoroughly mixed in a mixing drum. The granules so obtained are melt spun at 260°–285° C. to red filaments of good light fastness and textile fibers properties.

EXAMPLE 23

120 grams of anthraquinone yellow pigment crude (C.I. Pigment Yellow 147), 30 grams talc powder having an average particle size of around 3 µm, 1000 ml water and 4.5 grams of a sodium salt of a rosin (DRESINATE X from HERCULES Corp.), which is dissolved in 50 ml water, are added to a glass beaker equipped with thermometer and stirrer. The resulting pigment suspension is stirred at 20° to 28° C. for 20 minutes. 1.5 grams calcium chloride dissolved in 30 ml water are added to precipitate the rosin as calcium salt. The suspension is stirred for further 15 minutes at a pH of 5.5 to 5.8. The pigment suspension is then ground in a bead mill having a 600 ml steel milling chamber filled with 480–510 ml of glass beads with a diameter of about 1 mm, at a stirring speed of 3000 rpm. The plastic disc stirrer has a tip speed of 10.2 m/sec. The pigment suspension is milled for 45 minutes, whereby the pigment suspension is circulated continuously from the beaker through the mill and back into the same beaker at a speed of 250 ml/min. and at a temperature of 20° to 28° C. The pH of the resultant pigment suspension is adjusted to 5.5 to 5.8 then filtered. The filter cake is washed with water and dried at 80°–100° C.

The pigment has a specific surface area of 17.8 m²/g determined by the BET method. The electron micrograph shows the principal portion of the particles with a pigment particle size of 0.1 to 3.0 m. The yellow pigment shows good stir-in pigment properties and yields strong yellow colorations when applied in plastics and paints.

I claim:

1. A pigment composition comprising a physical mixture of from 1 to 35 parts by weight of a filler and from 65 to 99 parts by weight of an organic pigment, wherein the filler has a mean particle size smaller than 10 µm, and a narrow particle size distribution wherein at least 75 percent of the filler particles are smaller than 15 µm; wherein the sum of the parts by weight of the filler and the organic pigment is 100, wherein said composition is capable of being uniformly dispersed in a high molecular weight organic material without a dispersion milling step.

2. A pigment composition of claim 1 wherein 95 percent of the filler particles are smaller than 27 µm.

3. A pigment composition of claim 1, wherein the mean particle size of the filler is in the range from 0.1 to 9 µm.

4. A pigment composition of claim 3, wherein the mean particle size of the filler is in the range from 0.2 to 4 µm.

5. A pigment composition of claim 1, wherein the filler is an inorganic filler selected from the group consisting of mica, kaolin, talc and a natural or synthetic silica.

6. A pigment composition of claim 5, wherein the inorganic filler pigment is a talc, muscovite mica, kaolin or a mixture thereof.

7. A pigment composition of claim 1, wherein the filler is an organic filler having a high-molecular-weight which is prepared by micronization or by direct synthesis.

8. A pigment composition of claim 7, wherein the organic filler is an ethylene homopolymer or copolymer, a propylene homopolymer or copolymer, or a polyamide or a mixture thereof.

9. A pigment composition of claim 8, wherein the polymeric filler is a polyethylene powder consisting essentially of spherical particles.

10. A pigment composition of claim 7, wherein the polymeric filler is a polyamide powder obtained by precipitation of polymerized lauryllactam and/or caprolactam.

11. A pigment composition of claim 1, wherein the organic pigment is an azo, azomethine, methine, anthraquinone, phthalocyanine, perinone, perylene, diketopyrrolopyrrole, thioindigo, iminoisoindolinone, iminoisoindoline, quinacridone, flavanthrone, indanthrone, anthrapyrimidine or quinophthalone pigment.

12. A pigment composition of claim 11, wherein the organic pigment has an average particle size in the range of from 0.005 to 10 µm.

13. A pigment composition of claim 12, wherein the organic pigment has an average particle size in the range from 0.01 to 5 µm.

14. A pigment composition of claim 11, wherein the organic pigment is a pigment crude.

15. A pigment composition of claim 11, wherein the organic pigment is a diketopyrrolopyrrole, quinacridone, anthraquinone, phthalocyanine, indanthrone, iminoisoindoline or iminoisoindolinone pigment.

16. A pigment composition of claim 11, wherein the organic pigment is selected from the group consisting of C.I. Pigment Red 202, C.I. Pigment Violet 19, C.I. Pigment Red 122, C.I. Pigment Red 179, C.I. Pigment Red 170, C.I. Pigment Red 144, C.I. Pigment Brown 23, C.I. Pigment Yellow 109, C.I. Pigment Yellow 110, C.I. Pigment Red 254, C.I. Pigment Red 255, C.I. Pigment Red 264, C.I. Pigment Orange 71, C.I. Pigment Orange 73, C.I. Pigment Blue 15, C.I. Pigment Blue 60, C.I. Pigment Red 177, C.I. Pigment Yellow 147.

17. A pigment composition of claim 1, wherein the pigment composition comprises from 3 to 30 parts by weight of the filler and from 70 to 97 parts per weight of the organic pigment.

18. A pigment composition of claim 17, which comprises from 5 to 25 parts by weight of the filler and from 75 to 95 parts by weight of the organic pigment.

19. A process for the preparation of a pigment composition of claim 1, wherein a filler is present during a preparatory or conditioning process used to prepare the organic pigment.

20. A pigment composition of claim 1, wherein said pigment composition further comprises from 0.05 to 20 parts by weight of a texture-improving agent selected from the group consisting of fatty acids having at least 12 carbon atoms, or amides, esters or salts thereof, aliphatic 1,2-diols, epoxidized soya bean oil, ethoxylated fatty alcohols, waxes, resin acids or resin acid salts.

21. A pigment composition of claim 20, wherein the pigment composition comprises from 1 to 10 parts by weight of the texture-improving agent.

22. A pigment composition of claim 20, wherein the texture-improving agent is a rosin acid or a rosin acid salt, aliphatic 1,2-diol, epoxidized soya bean oil or ethoxylated fatty alcohol or a mixture thereof.

23. A process for the preparation of a pigment composition of claim 20, which comprises
   a) preparing an aqueous suspension comprising the organic pigment, the filler and the texture-improving agent,
   b) precipitating an insoluble salt of the texture-improving agent by adding a salt of a divalent or trivalent metal to the aqueous suspension, and
   c) isolating the pigment composition.

24. A process of claim 23 which further comprises a wet-milling step before or after step (b).

25. A process of claim 23, wherein the pigment composition is dried in fluidized bed, spray-drying or tray-drying equipment.

26. A process of claim 25, wherein the drying step is followed by a micropulverization step.

27. A method of laser marking, which comprises irradiating a substrate which contains a pigment composition of claim 1 with a laser.

28. A coating composition which comprises a high-molecular-weight organic material and an effective pigmenting amount of a pigment composition of claim 1.

29. An ultraviolet or electron beam curable ink composition which comprises an ultraviolet or electron beam curable high-molecular-weight organic material and an effective pigmenting amount of a pigment composition of claim 1.

* * * * *